United States Patent
Thorpe et al.

[11] Patent Number: 6,001,437
[45] Date of Patent: Dec. 14, 1999

[54] METHOD OF MAKING HIGH-TEMPERATURE GLASS FIBER AND THERMAL PROTECTIVE STRUCTURES

[75] Inventors: Allen W. Thorpe, Olivette; Edward W. Taylor, Jr., Ballwin; Rubin Feldman, Ladue; Malkit S. Deogon, Chesterfield, all of Mo.

[73] Assignee: Nu-Chem, Inc., Fenton, Mo.

[21] Appl. No.: 08/895,918

[22] Filed: Jul. 17, 1997

[51] Int. Cl.⁶ .............................. B32B 17/04; B65D 1/42; C03C 25/06; B29C 45/14
[52] U.S. Cl. .................. 428/34.5; 428/36.1; 428/410; 428/428; 428/921; 216/97; 216/108; 220/645; 264/257; 524/494; 523/179
[58] Field of Search .................... 428/34.5, 36.1, 428/410, 428, 921; 216/97, 108; 220/645; 264/257; 524/494

[56] References Cited

U.S. PATENT DOCUMENTS

| | | |
|---|---|---|
| 2,461,841 | 2/1949 | Nordberg . |
| 2,491,761 | 12/1949 | Parker et al. . |
| 2,680,077 | 6/1954 | Nielsen et al. . |
| 2,992,960 | 7/1961 | Leeg et al. . |
| 3,284,216 | 11/1966 | Kaplan . |
| 3,692,186 | 9/1972 | Marzocchi ........................ 210/494.1 |
| 3,849,178 | 11/1974 | Feldman . |
| 4,063,001 | 12/1977 | Zlochower ............... 428/410 |
| 4,493,945 | 1/1985 | Feldman . |
| 4,529,467 | 7/1985 | Ward et al. . |
| 4,627,951 | 12/1986 | Shen .................. 264/109 |
| 5,020,687 | 6/1991 | Seizert ................. 220/645 |
| 5,037,690 | 8/1991 | van der kooy .......... 428/116 |
| 5,106,679 | 4/1992 | Wataya et al. ........... 428/285 |
| 5,242,744 | 9/1993 | Schryer .................. 428/224 |
| 5,258,159 | 11/1993 | Freeman et al. ........ 264/513 |
| 5,308,571 | 5/1994 | Stiles et al. ............ 264/257 |
| 5,334,427 | 8/1994 | Cognet et al. .......... 428/34.5 |
| 5,344,038 | 9/1994 | Freeman et al. ........ 220/453 |
| 5,372,846 | 12/1994 | Feldman et al. . |
| 5,401,793 | 3/1995 | Kobayashi et al. . |
| 5,591,791 | 1/1997 | Deogon . |
| 5,645,926 | 7/1997 | Horrock et al. ........ 428/921 |
| 5,709,925 | 1/1998 | Spengler et al. ........ 428/198 |
| 5,804,638 | 9/1998 | Hayashi et al. ......... 524/494 |

OTHER PUBLICATIONS

Elmer, "Leaching of E–Glass," J. Amer. Ceramic Soc., 67(12), Dec. 1984, pp. 778–782.

Ramachandran, et al., "Studies of the Acid Resistance of E Glass," J. Amer. Ceramic Soc., 63(1–2), Jan.–Feb. 1980, pp. 1–3.

*Primary Examiner*—Tae Yoon
*Attorney, Agent, or Firm*—Polster, Lieder Woodruff & Lucchesi

[57] ABSTRACT

A glass fiber capable of withstanding temperatures in excess of 1900° F. is produced by treating a glass, preferably E-glass, fiber. The glass fiber is first leached with selected acids, and then the leached fiber is treated with organo-metallic materials of low viscosity, such as a dispersion of low molecular weight water-in-oil emulsion of dimethyl polysiloxane. The fiber is used in such applications as embedding it in a fire-resistant active coating material or embedding it into one surface of a polyolefin or composite plastic, such as a polypropylene sheet. The treated fiberglass can be used as a sole component or in concert with a fire-resistant or fire retardant material to further enhance its fire-resistant properties.

32 Claims, No Drawings

METHOD OF MAKING HIGH-TEMPERATURE GLASS FIBER AND THERMAL PROTECTIVE STRUCTURES

BACKGROUND OF THE INVENTION

This invention relates to a glass form, preferably a fiber, which resists high temperatures, at least 1900° F. and higher, while retaining at least some of its tensile strength and other physical properties.

In numerous applications, fabrics are utilized in systems which resist high temperatures. An example of the use of such fabrics is in reinforced coating systems. In these systems, the fabric is embedded in a char-forming, fire-resistive coating such as those described in Deogon, U.S. Pat. No. 5,591,791. Briefly, such coatings include ablative coatings, which swell to less than twice their original thickness when exposed to fire or other thermal extremes, intumescent coatings such as those disclosed in Nielsen et al., U.S. Pat. No. 2,680,077, Kaplan, U.S. Pat. No. 3,284,216, or Ward et al., U.S. Pat. No. 4,529,467, which swell to produce a char more than five times the original thickness of the coating, and subliming char-forming coatings of the type disclosed in Feldman, U.S. Pat. No. 3,849,178, which undergo an endothermic phase change and expand two to five times their original thickness to form a continuous porosity matrix. The intumescent and subliming coatings are denoted "active" thermal protective coatings.

The time required for a given temperature rise across a predetermined thickness of the composition, under specified heat flux, environmental, and temperature conditions, is a measure of the composition's effectiveness in providing thermal protection to an underlying substrate.

Eventually, the char is consumed by physical erosion and by chemical processes, such as oxidation by oxygen in the air and by free radicals produced by the coating or otherwise in a fire environment, and protection is substantially reduced. Before the char is totally consumed, degradation of the char layer leaves it crumbled and without the necessary strength to sustain itself, causing it to fail by being blown off or simply falling off (spalling).

Some of these chars degrade rapidly during exposure to high temperature, high heat flux environments. In the case of coatings which swell when exposed to thermal extremes, the degradations are usually in the form of fissures which are formed in the char as a result of differential thermal stresses produced by the high thermal gradients with them, and differential thermal expansion between the virgin material and the char.

To increase the strength of char layers during exposure to thermal extremes, and to limit spalling and fissures, fabrics have long been incorporated in the coating materials. As set out in Feldman et al., U.S. Pat. No. 5,622,774, fiberglass fabric provides an inexpensive, easy to install, reinforcement in many high temperature applications. In certain applications, however, such as coatings which may be exposed to high velocity petroleum fires or to high-temperature, high heat flux fires which will raise the fabric to temperatures above the softening point of the glass (around 1600° F.), the fiberglass fabric has disintegrated. Other fabrics have therefore been required. Graphite cloth, as taught in the foregoing Feldman et al. U.S. Pat. No. 5,622,774 and in Kobayashi et al., U.S. Pat. No. 5,401,793, is very expensive. Refractory materials, such as quartz (Refrasil) fabric is also expensive. Metal mesh is inexpensive but it is heavy and difficult to install, particularly because it generally requires welding metal studs to the substrate to be protected.

Other examples of fabric-reinforced systems are laminates in which the fabric is embedded directly in a structural resin material itself, for example in the structure of a furnace or a rocket nozzle. Generally, these materials also produce a char when exposed to sufficiently high temperatures, although in many applications they are routinely exposed to high temperatures below their char-forming temperature for extended periods. In other applications they are exposed for short periods to temperature, heat flux, and environmental conditions which do not cause a char to form, but which are sufficiently high to cause serious loss of structural properties. Examples of these latter systems are automobile gasoline tanks and trunks, which can be made of plastic material if they can pass a test involving preventing structural failure (such as drop through or explosion in the case of a gasoline tank) when the tank or trunk is placed over a fire of a specified temperature and intensity for a predetermined period such as two minutes. In all of these conditions, a fabric which resists complete degradation under the foregoing conditions can provide sufficient structural integrity to impede failure of the system.

Attempts have been made for many years to produce a glass fiber which retains a substantial portion of its mechanical properties even when subjected to very high temperatures, greater than 1600° F. (871° C.), and preferably on the order of 1900° to 2000° F. (1038° to 1093° C.). Examples are Nordberg, U.S. Pat. No. 2,461,841, Parker et al., U.S. Pat. No. 2,491,761, and Leeg et al., U.S. Pat. No. 2,992,960. These patents all involve leaching of the glass fiber with mineral acid, followed by treatment with a sizing material. Heretofore, such attempts have failed to provide a reliable, reproducible, and efficient process of converting commercial grade fiberglass (such as Type E and Type F glass fibers) into a material capable of withstanding elevated temperatures and aerodynamic shear which may be coupled with elevated temperatures.

BRIEF SUMMARY OF THE INVENTION

One of the objects of the present invention is to provide a reliable, reproducible, and efficient method of converting commercial grade fiberglass into a material capable of withstanding elevated temperatures.

Another object is to provide such a method which produces a fiberglass material capable of withstanding aerodynamic shear which may be coupled with elevated temperatures.

Another object is to provide such a method which produces a fiberglass material which retains at least a substantial part of its "hand" after prolonged exposure to elevated temperatures.

Another object is to provide such a method which is adaptable to a wide variety of applications.

Another object is to provide such a method which is easy to apply and extremely effective.

Another object is to provide an improved fiberglass cloth material.

Another object is to provide improved structural elements incorporating the improved fiberglass cloth material.

Another object is to provide improved structural elements incorporating a structural resin, a fabric, and an active thermal protective material.

Other objects will become apparent to those skilled in the art in light of the following disclosure.

In accordance with one aspect of the present invention, generally stated, a method of making a heat-resistant fiberglass fabric is provided comprising soaking a fiberglass fabric in a carefully selected acid bath for a selected time at a selected temperature. We have found that soaking the fiberglass in a mixture of acids containing at least 15% sulfuric acid at room temperature for a period of more than twenty-four hours, preferably at least about forty-eight hours, produces a material which maintains a substantial part of its physical characteristics even when heated to a temperature of at least 1600° F. for a period of at least one hour. The molality of the mixed acids is below 8, preferably around 5. It is anticipated that shorter soak times may be achieved with higher temperatures.

We have also found that the acid-treated fiberglass can be given superior qualities, such as improved "hand" (texture) both before and during exposure to high temperatures, by soaking the fiberglass in a low viscosity organo-metallic material, such as a low molecular weight silicone to fill the pores of the glass. The silicone is preferably in the form of a water-in-oil emulsion of low molecular weight silicone, such as dimethyl polysiloxane. The use of a water-in-oil emulsion, rather than an oil-in-water emulsion, inhibits the formation of silicone micelles and enhances absorption of the silicone into the pores of the glass fibers. We have found that soaking a fiberglass fabric for a period of more than forty-eight hours, preferably at least seventy-two hours, at room temperature in a low molecular weight, low viscosity, silicone bath produces superior results.

Certain combinations of acid treatment and treatment with low molecular weight silicone have been found to produce materials which consistently will withstand being heated to a temperature of 1900° F. for at least one hour in a muffle furnace.

The improved fabric has numerous uses, as will be apparent to those skilled in the art. It provides a superior reinforcement in thermal protective coating systems of the types previously described. For example, it may be embedded in fire-protective coatings of subliming, intumescing and ablative types, and has been found to provide excellent results as a reinforcement in sprayed-on subliming coating systems. It may also be used in active or passive cast or molded self-supporting thermal protective systems such as the system described in Feldman, U.S. Pat. No. 4,493,945.

In accordance with another aspect of the invention, structural members formed of thermoplastic resins are strengthened and protected from fire for extended periods by incorporating in them a high-temperature fiberglass fabric made in accordance with the present invention. The fabric is preferably pressed into a resin sheet as the sheet is formed into a container or other functional entity. In accordance with yet another aspect of the invention, such structural members are protected with a fabric or mesh which is pretreated with an active (intumescing or subliming) thermal protective coating material and then embedded in the thermoplastic material. The fabric is preferably a high-temperature fiberglass made by the method of the invention. Preferably, the fabric comprises an open weave mesh having from 0.5 to 20 openings per square centimeter. The active fire retardant material can be impregnated into the fiberglass or surface coated. It can be completely cured in a rigid or elastic form; it can also be supplied in a precured condition or in a semi-cured condition to be cured during processing. The cells of the treated or impregnated fiberglass can be open or filled. For some materials such as polypropylene, an open cell is preferred as it enables the softened polypropylene to pass through the opening and form a mechanical lock.

DETAILED DESCRIPTION OF THE INVENTION

To determine the effect of different acid compositions and exposure times at a constant temperature and acid molality, and to determine the effect of further treatment in a low molecular weight polysiloxane at a constant temperature for different time periods, a series of tests was made. The results of these tests are shown in Table 1.

TABLE 1

| Sample No. | Acid Bath Mole Ratio Cl | NO3 | SO4 | Time in Bath Hr. | Wt Change % | Time in Silicone Hr. | Wt Change From orig | Wt Change From acid | Wt Change In muffle | Wt Change From orig. | Comments |
|---|---|---|---|---|---|---|---|---|---|---|---|
| Blank | | | | | | | | | −12.44% | −12.44% | shrunk, melted |
| A-1 | 1 | 1 | 1 | 3 | −0.08% | 0 | −0.08% | 0.00% | −11.76% | −11.83% | fragile, crisp |
| A-2 | 1 | 1 | 1 | 3 | −0.77% | 6 | 5.82% | 6.64% | −16.89% | −12.05% | slightly fragile |
| A-3 | 1 | 1 | 1 | 3 | −0.34% | 24 | 6.28% | 6.63% | −17.40% | −12.22% | slightly fragile |
| A-4 | 1 | 1 | 1 | 3 | 0.00% | 72 | 7.68% | 7.68% | −17.38% | −11.04% | slightly fragile |
| A-5 | 1 | 1 | 1 | 8 | −0.30% | 0 | −0.22% | 0.08% | −13.80% | −13.98% | less fragile |
| A-6 | 1 | 1 | 1 | 8 | −0.69% | 6 | 5.66% | 6.39% | −17.24% | −12.55% | less fragile |
| A-7 | 1 | 1 | 1 | 8 | −0.35% | 24 | 7.51% | 7.89% | −18.56% | −12.44% | less fragile |
| A-8 | 1 | 1 | 1 | 8 | −0.60% | 72 | 7.01% | 7.64% | −17.37% | −11.58% | very nice |
| A-9 | 1 | 1 | 1 | 24 | −2.92% | 0 | −2.93% | −0.10% | −17.81% | −20.21% | less fragile |
| A-10 | 1 | 1 | 1 | 24 | −3.88% | 6 | 2.84% | 6.83% | −21.10% | −18.86% | less fragile |
| A-11 | 1 | 1 | 1 | 24 | −1.92% | 24 | 6.92% | 8.97% | −20.33% | −14.81% | less fragile |
| A-12 | 1 | 1 | 1 | 24 | −2.12% | 72 | 0.18% | 2.30% | −20.07% | −19.92% | nice |
| A-13 | 1 | 1 | 1 | 48 | −6.59% | 0 | −6.15% | 0.04% | −23.14% | −27.86% | very nice - fuzzy |
| A-14 | 1 | 1 | 1 | 48 | −7.04% | 6 | 3.91% | 11.22% | −26.89% | −24.03% | soft - fuzzy |
| A-15 | 1 | 1 | 1 | 48 | −6.38% | 24 | 3.98% | 10.62% | −26.33% | −23.39% | very nice - fuzzy |
| A-16 | 1 | 1 | 1 | 48 | −4.54% | 72 | −3.38% | 1.00% | −26.16% | −28.66% | very nice - fuzzy |
| B-1 | 2 | 3 | 1 | 3 | −0.25% | 0 | −0.27% | −0.02% | −10.58% | −10.82% | fragile |
| B-2 | 2 | 3 | 1 | 3 | −0.39% | 6 | 6.86% | 7.28% | −14.91% | −9.07% | fragile |
| B-3 | 2 | 3 | 1 | 3 | 0.02% | 24 | 6.01% | 5.98% | −18.29% | −13.38% | fragile |
| B-4 | 2 | 3 | 1 | 3 | −0.32% | 72 | 7.62% | 7.97% | −16.37% | −10.00% | less fragile |
| B-5 | 2 | 3 | 1 | 8 | −0.85% | 0 | −0.79% | 0.05% | −13.56% | −14.24% | fragile |
| B-6 | 2 | 3 | 1 | 8 | −0.95% | 6 | 4.26% | 5.25% | −17.62% | −14.11% | less fragile |

TABLE 1-continued

| Sample No. | Acid Bath Mole Ratio Cl | Acid Bath Mole Ratio NO3 | Acid Bath Mole Ratio SO4 | Time in Bath Hr. | Wt Change % | Time in Silicone Hr. | Wt Change From orig | Wt Change From acid | Wt Change In muffle | Wt Change From orig. | Comments |
|---|---|---|---|---|---|---|---|---|---|---|---|
| B-7  | 2 | 3 | 1 | 8  | −1.10%  | 24 | 5.56%   | 6.71%   | −15.79% | −11.11% | nice |
| B-8  | 2 | 3 | 1 | 8  | −0.85%  | 72 | 5.48%   | 6.38%   | −18.26% | −13.78% | slightly fragile |
| B-9  | 2 | 3 | 1 | 24 | −5.47%  | 0  | −5.27%  | −0.10%  | −16.44% | −20.85% | less fragile |
| B-10 | 2 | 3 | 1 | 24 | −3.24%  | 6  | 1.86%   | 5.16%   | −20.06% | −18.56% | nice |
| B-11 | 2 | 3 | 1 | 24 | −4.40%  | 24 | 4.70%   | 9.31%   | −20.89% | −17.18% | less fragile |
| B-12 | 2 | 3 | 1 | 24 | −4.31%  | 72 | 0.79%   | 5.14%   | −20.59% | −19.96% | nice |
| B-13 | 2 | 3 | 1 | 48 | −10.86% | 0  | −9.58%  | 0.23%   | −19.86% | −27.54% | very nice - fuzzy |
| B-14 | 2 | 3 | 1 | 48 | −10.29% | 6  | 1.02%   | 11.42%  | −24.77% | −24.00% | nice - fuzzy |
| B-15 | 2 | 3 | 1 | 48 | −9.63%  | 24 | 3.29%   | 13.24%  | −24.99% | −22.52% | nice - fuzzy |
| B-16 | 2 | 3 | 1 | 48 | −10.89% | 72 | −0.31%  | 10.54%  | −24.76% | −24.99% | nice - fuzzy |
| C-1  | 4 | 2 | 1 | 3  | −0.09%  | 0  | −0.10%  | −0.01%  | −13.10% | −13.19% | fragile |
| C-2  | 4 | 2 | 1 | 3  | 0.00%   | 6  | 5.52%   | 5.52%   | −16.48% | −11.87% | slightly fragile |
| C-3  | 4 | 2 | 1 | 3  | −0.15%  | 24 | 7.62%   | 7.78%   | −16.79% | −10.45% | less fragile |
| C-4  | 4 | 2 | 1 | 3  | −0.08%  | 72 | 7.30%   | 7.39%   | −18.17% | −12.20% | slightly fragile |
| C-5  | 4 | 2 | 1 | 8  | −0.94%  | 0  | −0.85%  | 0.07%   | −13.07% | −13.81% | slightly fragile |
| C-6  | 4 | 2 | 1 | 8  | −1.04%  | 6  | 4.57%   | 5.66%   | −18.14% | −14.40% | less fragile |
| C-7  | 4 | 2 | 1 | 8  | −0.67%  | 24 | 4.30%   | 4.99%   | −18.83% | −15.34% | slightly fragile |
| C-8  | 4 | 2 | 1 | 8  | −0.53%  | 72 | 4.78%   | 5.34%   | −19.15% | −15.28% | slightly fragile |
| C-9  | 4 | 2 | 1 | 24 | −4.83%  | 0  | −4.63%  | −0.02%  | −16.68% | −20.54% | less fragile |
| C-10 | 4 | 2 | 1 | 24 | −5.38%  | 6  | 1.54%   | 7.00%   | −18.95% | −17.70% | slightly fragile |
| C-11 | 4 | 2 | 1 | 24 | −5.18%  | 24 | 3.98%   | 9.36%   | −19.70% | −16.50% | less fragile |
| C-12 | 4 | 2 | 1 | 24 | −4.62%  | 72 | 1.52%   | 6.21%   | −19.55% | −18.32% | less fragile |
| C-13 | 4 | 2 | 1 | 48 | −11.42% | 0  | −10.10% | 0.17%   | −18.76% | −26.96% | nice |
| C-14 | 4 | 2 | 1 | 48 | −11.08% | 6  | 1.59%   | 12.85%  | −23.59% | −22.38% | less fragile |
| C-15 | 4 | 2 | 1 | 48 | −10.30% | 24 | 4.90%   | 15.71%  | −25.06% | −21.38% | less fragile |
| C-16 | 4 | 2 | 1 | 48 | −10.51% | 72 | 0.06%   | 10.57%  | −22.90% | −22.85% | less fragile |
| D-1  | 1 | 1 | 4 | 3  | 8.87%   | 0  | 1.78%   | −7.24%  | −15.64% | −14.14% | slightly fragile |
| D-2  | 1 | 1 | 4 | 3  | 1.56%   | 6  | 10.81%  | 9.08%   | −17.73% | −8.84%  | slightly fragile |
| D-3  | 1 | 1 | 4 | 3  | 0.88%   | 24 | 12.22%  | 11.23%  | −16.50% | −6.30%  | fragile |
| D-4  | 1 | 1 | 4 | 3  | 1.29%   | 72 | 9.14%   | 7.73%   | −20.98% | −13.76% | fragile |
| D-5  | 1 | 1 | 4 | 8  | 1.32%   | 0  | 1.36%   | 0.02%   | −15.18% | −14.03% | nice |
| D-6  | 1 | 1 | 4 | 8  | 0.77%   | 6  | 9.52%   | 8.67%   | −21.82% | −14.38% | slightly fragile |
| D-7  | 1 | 1 | 4 | 8  | 0.27%   | 24 | 7.21%   | 6.93%   | −19.01% | −13.17% | slightly fragile |
| D-8  | 1 | 1 | 4 | 8  | 0.58%   | 72 | 4.50%   | 3.90%   | −19.29% | −15.66% | less fragile |
| D-9  | 1 | 1 | 4 | 24 | 1.45%   | 0  | 1.71%   | 0.24%   | −18.33% | −16.93% | nice |
| D-10 | 1 | 1 | 4 | 24 | 0.63%   | 6  | 12.25%  | 11.54%  | −22.71% | −13.25% | nice fuzzy |
| D-11 | 1 | 1 | 4 | 24 | 2.10%   | 24 | 12.89%  | 10.52%  | −22.24% | −12.21% | nice fuzzy |
| D-12 | 1 | 1 | 4 | 24 | 2.09%   | 72 | 0.08%   | −2.01%  | −21.21% | −21.15% | nice |
| D-13 | 1 | 1 | 4 | 48 | 4.73%   | 0  | 8.04%   | 2.93%   | −23.89% | −17.77% | nice |
| D-14 | 1 | 1 | 4 | 48 | 10.98%  | 6  | 18.84%  | 5.78%   | −24.70% | −10.52% | soft fuzzy |
| D-15 | 1 | 1 | 4 | 48 | 10.92%  | 24 | 22.15%  | 8.80%   | −24.48% | −7.75%  | nice fuzzy |
| D-16 | 1 | 1 | 4 | 48 | 11.01%  | 72 | −1.13%  | −12.01% | −23.98% | −24.84% | nice fuzzy |
| E-1  | 1 | 0 | 4 | 3  | 0.29%   | 0  | 0.31%   | 0.02%   | −11.51% | −11.23% | slightly fragile |
| E-2  | 1 | 0 | 4 | 3  | 0.54%   | 6  | 10.84%  | 10.25%  | −18.64% | −9.82%  | slightly fragile |
| E-3  | 1 | 0 | 4 | 3  | 0.46%   | 24 | 12.85%  | 12.33%  | −18.33% | −7.84%  | slightly fragile |
| E-4  | 1 | 0 | 4 | 3  | 0.56%   | 72 | 9.88%   | 9.27%   | −21.75% | −14.02% | less fragile |
| E-5  | 1 | 0 | 4 | 8  | 2.41%   | 0  | 2.55%   | 0.08%   | −17.69% | −15.60% | slightly fragile |
| E-6  | 1 | 0 | 4 | 8  | 2.64%   | 6  | 11.64%  | 8.70%   | −18.82% | −9.37%  | slightly fragile |
| E-7  | 1 | 0 | 4 | 8  | 3.02%   | 24 | 8.06%   | 4.80%   | −18.54% | −11.97% | less fragile |
| E-8  | 1 | 0 | 4 | 8  | 3.49%   | 72 | 3.58%   | −0.03%  | −18.44% | −15.52% | slightly fragile |
| E-9  | 1 | 0 | 4 | 24 | 7.70%   | 0  | 8.08%   | −0.24%  | −22.04% | −15.74% | very nice |
| E-10 | 1 | 0 | 4 | 24 | 5.88%   | 6  | 14.80%  | 8.05%   | −24.62% | −13.47% | soft fuzzy |
| E-11 | 1 | 0 | 4 | 24 | 7.78%   | 24 | 17.76%  | 9.78%   | −24.16% | −10.69% | very nice |
| E-12 | 1 | 0 | 4 | 24 | 7.04%   | 72 | −0.18%  | −7.21%  | −21.80% | −21.94% | nice fuzzy |
| E-13 | 1 | 0 | 4 | 48 | 10.58%  | 0  | 11.47%  | −0.32%  | −22.83% | −13.98% | soft fuzzy |
| E-14 | 1 | 0 | 4 | 48 | 8.31%   | 6  | 18.63%  | 8.78%   | −25.45% | −11.56% | very nice fuzzy |
| E-15 | 1 | 0 | 4 | 48 | 11.11%  | 24 | 15.43%  | 2.62%   | −25.56% | −14.07% | nice fuzzy |
| E-16 | 1 | 0 | 4 | 48 | 3.15%   | 72 | 0.37%   | −2.79%  | −24.33% | −24.05% | nice fuzzy |

Examined E13, A15, B15, C15, D15 & E15
E13 & E15 showed no visible differences under 30x microscope
Weave threads of samples E13, E15 & D15 looked swollen
These samples also had a softer "hand" and drooped more.

In making these tests, the following procedure was followed.

An acid bath was prepared by weighing the relative quantities of acid, mixing the acid thoroughly, and adding sufficient water to obtain a 5.0 molal solution. The selection of the 5.0 concentration was arbitrary, but it has been found that molalities of 8 or above do not function as well.

Samples of the unraveled fiberglass material (Type E, J. P. Stevens Type 1353) were weighed and then totally immersed in the acid bath for the indicated number of hours.

At the completion of each individual immersion period, the fiberglass sample was removed from the acid bath, carefully washed with clean water, dried, and weighed. This weight was compared to the weight of the sample in its virgin state.

Some of the acid-treated fiberglass samples were then totally immersed in a bath of low molecular weight dimethyl polysiloxane in the form of a dispersion of water in the polysiloxane oil. The dispersion was formed from a concentrate of low molecular weight dimethyl polysiloxane in a water-in-oil emulsion, as sold by Blackhawk Specialty Products, Inc., Rock Island, Illinois, as its BSP-89W. The time spent in the silicone bath is recorded in Table 1 for each sample.

The sample was then placed in a muffle furnace which was maintained at a constant temperature of about 1600° F. This temperature was selected to represent a typical average temperature within a char layer which results from the exposure of a subliming or intumescing material which is applied to a steel substrate in thicknesses that are capable of meeting relevant ASTM E-119 type fires for one, two, or more hours in duration.

The sample was kept in this environment for a period of about sixty minutes, then removed from the muffle furnace and cooled. Upon completion of cooling, it was examined for embrittlement, "hand" retention, and weight loss. If the sample retained its "hand" (indicated by the word "nice" in the comments section of Table 1) then it was subjected to further tests. It will be seen from Table 1 that samples A-8, A-12 through A-16, B-7, B-10, B-11 through B-16, C-13, D-5, D-9 through D-16, and E-9 through E-16 met the foregoing criterion and were tested further. All of these samples were soaked in the room temperature acid for a period in excess of three hours. All but C-13 had been soaked in a mixture including in excess of 15% sulfuric acid.

Fresh samples taken from corresponding lots as the foregoing samples were further exposed to 1600° F. in the muffle furnace for a period of sixty minutes. After cooldown, they were again checked for "hand retention," and results recorded. The samples which were embrittled were eliminated from further testing, leaving samples A-13 through A-16, D-13 through D-16, and E-13 through E-16 to be tested further.

Fresh samples taken from corresponding item lots as the foregoing samples were exposed to a muffle furnace fire at a temperature of about 1900° F. to about 2000° F. for a period of one hour. This temperature was selected because it represents a thermal environment most likely encountered within the char layer of a subliming or intumescing material which is exposed to a hydrocarbon fire environment as defined by Underwriters Laboratory procedure 1709 or a jet fire environment as defined by British Offshore Technology Report OTO 93 028 (Dec. 21, 1993). After cooldown, the samples were checked for "hand" retention, and results were recorded. The three item samples which were not embrittled were A-16, D-13, and E-16. All the most successful samples had been soaked at room temperature for over twenty-four hours in an acid solution containing in excess of 15% molal sulfuric acid, and two of the three samples had been soaked at room temperature for over twenty-four hours in the low-viscosity silicone emulsion.

Preliminary fire tests of the treated fiberglass fabric in a subliming fire-protective coating system indicate that the system provides superior results.

To further test the treated fabrics, and to demonstrate their usefulness in composite materials, the material was embedded in small (approximately 10 cm square) test polypropylene sheets as follows. In separate tests, two active fire protective materials were applied to the fabric: a subliming material (Thermal Science, Inc. THERMO-LAG 440-1) and a thin-film intumescent material (Thermal Science, Inc. THERMO-LAG 2000). In each case, the active thermal protective material was thinned in a solvent or low viscosity resin diluent. The treated fiberglass fabric was placed in a container of the thinned material and squeezed in a wringer to remove excess coating. This produces a coating of material on the fabric which covers the fibers of the fabric but does not close the individual cells in the fabric mesh. The coated fabric was heated to semicure the subliming material or to cure the intumescent material. The fiberglass remained somewhat elastic.

Polypropylene is a hard material with a surface that is difficult to adhere to. The test square was heated to 200° to 210° C. The female portion of a mold was heated to 60–70° C. The mold includes a ram with a platen which is heated to 60–70° C. The thermoplastic square was quickly placed into the mold with the fabric on top of it, and the ram was be moved quickly to mold the plastic before a skin is formed on the plastic. The sample was removed from the mold. This process caused the polypropylene to exude through the openings in the woven fabric and physically lock the fabric to the plastic sheet. Comparative flame tests without reinforcement, with untreated fiberglass, with treated fiberglass, and with treated fiberglass coated with each of the active thermal protective materials showed that the treated fiberglass systems provided substantial increases in time to failure, and the coated fiberglass provided dramatic increases in time to failure.

Based on the foregoing tests, it is believed that the treated fiberglass fiber of the present invention can be embedded into thermoplastic structures by the same process of incorporation during the molding process. Other fibers, coated with active thermal protective materials, can also be embedded into thermoplastic structures. Composite sheets including the treated and/or coated fabric may also be formed either by passing a single heated thermoplastic sheet and a structural automotive elements, firewalls and other high temperature barriers such as used on jet engines. These variations are merely illustrative.

What is claimed is:

1. A method of treating fiberglass fiber to increase its resistance to heat, the method comprising treating the fiber with a mixture of acids comprising at least 15% sulfuric acid for a period sufficient to increase the softening point of the fiber to at least 1000° C.

2. The method of claim 1 wherein the fiber is formed into a fabric before it is treated.

3. The method of claim 2 wherein the acid mixture further comprises at least one other mineral acid.

4. The method of claim 3 wherein the acid mixture comprises hydrochloric acid.

5. The method of claim 1 wherein the fiber is E-glass.

6. The method of claim 1 wherein the fiber is soaked in an acid bath for a period in excess of twenty-four hours.

7. The method of claim 2 comprising a further step of treating the fabric with a low viscosity resin after the acid treatment step.

8. The method of claim 7 wherein the resin is a silicone oil.

9. The method of claim 8 wherein the silicone oil is a water in oil emulsion.

10. A composite material comprising at least one layer having embedded therein a fabric, the layer comprising a thermoplastic material, the fabric being precoated with an active thermal protective material selected from the group consisting of subliming and intumescing materials the fabric comprising fiberglass fiber having a softening point above about 1000° C.

11. The composite of claim 12 wherein the fabric comprises an open weave mesh having from 0.5 to 20 openings per square centimeter.

12. The composite of claim 10 wherein the active thermal protective material leaves openings in the weave of the fabric, the thermoplastic material extending into the openings and forming a physical lock with the fabric.

13. A container formed of the composite of claim 10.

14. The container of claim 13 wherein the container is a structural automotive container selected from the group consisting of trunk bases and fuel tanks.

15. A structural automotive component comprising an open pan having a bottom and a peripheral upstanding wall, the pan being formed of an organic thermoplastic material having a fabric mesh embedded therein the fabric mesh being precoated with an active thermal protective material selected from the group consisting of subliming and intumescing materials the fabric comprising fiberglass fiber having a softening point above about 1000° C.

16. The component of claim 15 wherein the mesh is on a lower side of the bottom and the outside of the upstanding wall.

17. The component of claim 16 wherein the fabric mesh is a single piece of material extending across the bottom and up at least a part of the peripheral wall.

18. The component of claim 15 wherein the fabric has been treated with a mixture of acids comprising at least 15% sulfuric acid.

19. The component of claim 15 wherein the component is a trunk base.

20. The component of claim 15 wherein the component is a fuel tank.

21. The method of claim 1 comprising a further step of embedding the fabric in at least one layer of thermoplastic.

22. The method of claim 1 comprising a further step of embedding the fibers in at least one layer of thermoplastic.

23. The method of claim 1 comprising a further step of dispersing the fibers in a thermal protective composition.

24. The method of claim 2 comprising a further step of embedding the fiberglass fabric in a thermal protective material.

25. The method of claim 24 wherein the thermal protective material is a coating applied to a substrate.

26. The method of claim 24 wherein the thermal protective composition is preformed into a self-supporting structure.

27. A method of protecting a substrate from fire or thermal extremes comprising treating a fiberglass fabric with a mixture of acids comprising at least 15% sulfuric acid for a period sufficient to increase the softening point of the fiber to at least 1000° C., applying to the substrate an uncured thermal protective material selected from the group consisting of intumescent materials and subliming materials, and thereafter a step of embedding the treated fiberglass fabric.

28. A method of treating fiberglass fiber to give it superior high temperature resistance and texture, the method comprising treating the fiber with acid and thereafter, soaking the fiber in a water-in-oil emulsion of a low viscosity organo-metallic oil to fill pores in the glass.

29. The method of claim 28 wherein the low viscosity organo-metallic material is a low molecular weight silicone.

30. The method of claim 29 wherein the silicone is dimethyl polysiloxane.

31. The method of claim 1 wherein the molality of the mixed acids is below 8.

32. The method of claim 1 wherein the molality of the mixed acids is around 5.

* * * * *

UNITED STATES PATENT AND TRADEMARK OFFICE
CERTIFICATE OF CORRECTION

PATENT NO. : 6,001,437
DATED : December 14, 1999
INVENTOR(S) : Allen-W. Thorpe, et al.

It is certified that error appears in the above-identified patent and that said Letters Patent is hereby corrected as shown below:

Column 8, cancel lines 38 - 41 and insert therefor:

---into structural automotive containers, such as trunk bases and fuel tanks. For example, the structural automotive container may comprise an open pan having a bottom and a peripheral upstanding wall, the pan being formed of an organic thermoplastic material having a fabric mesh embedded therein. The mesh is illustratively a single piece which extends across a lower side of the bottom and up at least a part of the outside of an upstanding wall. The fabric mesh is precoated with an active thermal protective material, either a subliming material or an intumescing material. The fabric mesh is illustratively a fiberglass fiber having a softening point above about 1000° C., made by treatment with the illustrative mixture of acids comprising at least 15% sulfuric acid, although it could be another material. The structural automotive pan is illustratively formed by overlaying a thermoplastic polyolefin sheet with a precoated fabric cloth and then forming the sheet into an open pan having a bottom and a peripheral upstanding wall and simultaneously embedding

UNITED STATES PATENT AND TRADEMARK OFFICE
CERTIFICATE OF CORRECTION

PATENT NO. : 6,001,437
DATED : December 14, 1999
INVENTOR(S) : Allen W. Thorpe, et al.

It is certified that error appears in the above-identified patent and that said Letters Patent is hereby corrected as shown below:

the fabric in the thermoplastic sheet.

More generally, a composite material or structure may be formed by embedding in at least one layer of an organic resin a fabric produced either by precoating the fabric with an active (subliming or intumescing) material or by pretreating it with the acid treatment method of the present invention. The organic resin may be, for example, a polyolefin. Examples of uses of such structures are as structural automotive elements, firewalls and other high temperature barriers such as used on jet engines.

Likewise, a composite material may be formed of at least one layer of thermoplastic having embedded therein fibers produced by the acid treatment method of the present invention. Also, a thermal protective composition may be produced

UNITED STATES PATENT AND TRADEMARK OFFICE
CERTIFICATE OF CORRECTION

PATENT NO. : 6,001,437
DATED : December 14, 1999
INVENTOR(S) : Allen W. Thorpe, et al.

It is certified that error appears in the above-identified patent and that said Letters Patent is hereby corrected as shown below:

having dispersed therein fibers produced by the acid treatment method of the present invention. Examples of such thermal protective compositions are a coating applied to a substrate and a preformed self-supporting structure.

These variations are merely illustrative.---

Signed and Sealed this

Eighth Day of August, 2000

*Attest:*

Q. TODD DICKINSON

*Attesting Officer*   *Director of Patents and Trademarks*